United States Patent
Okuma

(10) Patent No.: US 9,682,796 B2
(45) Date of Patent: Jun. 20, 2017

(54) INJECTION CONTAINER STORAGE BOX DEVICE AND INJECTION CONTAINER PICKING SYSTEM INCLUDING THE DEVICE

(71) Applicant: Ookuma Electronic Co., Ltd., Kumamoto-shi, Kumamoto (JP)

(72) Inventor: Keiji Okuma, Kumamoto (JP)

(73) Assignee: OOKUMA ELECTRONIC CO., LTD., Kumamoto (JP)

(*) Notice: Subject to any disclaimer, the term of this patent is extended or adjusted under 35 U.S.C. 154(b) by 0 days.

(21) Appl. No.: 15/425,510

(22) Filed: Feb. 6, 2017

(65) Prior Publication Data

US 2017/0144310 A1 May 25, 2017

Related U.S. Application Data

(62) Division of application No. 14/140,001, filed on Dec. 24, 2013.

(51) Int. Cl.
*B65D 5/72* (2006.01)
*B65D 25/10* (2006.01)
*B25J 9/16* (2006.01)
*A61J 1/16* (2006.01)
*B25J 11/00* (2006.01)

(52) U.S. Cl.
CPC ............. *B65D 5/726* (2013.01); *A61J 1/16* (2013.01); *B25J 9/1697* (2013.01); *B25J 11/008* (2013.01); *B65D 25/103* (2013.01)

(58) Field of Classification Search
CPC ...... B65D 5/726; B65D 25/103; B25J 11/008; B25J 11/005
See application file for complete search history.

(56) References Cited

U.S. PATENT DOCUMENTS

| 1,558,484 A | 10/1925 | Kingsbury |
| 3,799,409 A * | 3/1974 | Goerke .................. B65D 5/726 222/561 |
| 4,105,270 A | 8/1978 | Bergkamp et al. |
| 4,905,864 A | 3/1990 | Balin |
| 5,738,216 A * | 4/1998 | Warner .................. B65D 5/509 206/523 |
| 5,957,285 A | 9/1999 | Lai |

(Continued)

FOREIGN PATENT DOCUMENTS

| DE | WO 9405554 A1 * | 3/1994 | ......... B65D 11/1833 |
| FR | EP 0720949 A2 * | 7/1996 | ............. B65D 11/18 |

(Continued)

*Primary Examiner* — Thomas Randazzo
(74) *Attorney, Agent, or Firm* — Norris McLaughlin & Marcus, P.A.

(57) ABSTRACT

An injection container storage box device that stores a plurality of cylindrical injection containers randomly loaded includes: a housing of which the upper and lower ends are open; and an opening/closing plate disposed in a lower end portion of the housing so as to freely slide to open and close a lower end opening, on which the injection containers are placed, wherein the opening/closing plate includes a corrugated surface in which a plurality of convex portions and a plurality of concave portions alternate continuously in a predetermined direction and the injection containers are put into a toppled state using the corrugated surface.

2 Claims, 11 Drawing Sheets

(56) References Cited

U.S. PATENT DOCUMENTS

| | | | | |
|---|---|---|---|---|
| 6,857,560 B2* | 2/2005 | Kutner | ............... | B65D 5/3607 |
| | | | | 222/105 |
| 7,313,464 B1* | 12/2007 | Perreault | ............... | B25J 9/1666 |
| | | | | 318/568.1 |
| 7,474,939 B2* | 1/2009 | Oda | ............... | B25J 9/1697 |
| | | | | 382/153 |
| 7,610,115 B2* | 10/2009 | Rob | ............... | A61J 1/20 |
| | | | | 318/568.11 |
| 8,295,975 B2* | 10/2012 | Arimatsu | ............... | B25J 9/1697 |
| | | | | 700/216 |
| 9,079,308 B2* | 7/2015 | Martinez | ............... | B25J 9/1687 |
| 9,089,971 B2* | 7/2015 | Aoba | ............... | B25J 9/1697 |
| 9,132,548 B2* | 9/2015 | Kamiya | ............... | B25J 9/1669 |
| 2008/0173643 A1 | 7/2008 | Wadsworth et al. | | |
| 2014/0107953 A1* | 4/2014 | Mueller | ............... | B65G 11/023 |
| | | | | 702/54 |

FOREIGN PATENT DOCUMENTS

| | | | | |
|---|---|---|---|---|
| JP | WO 2014002655 A1 * | 6/1997 | ............ | B65D 25/02 |
| JP | 10-328253 | 12/1998 | | |
| JP | 2007-182240 | 7/2007 | | |
| JP | 2008-62376 | 3/2008 | | |
| JP | 2010-115339 | 5/2010 | | |
| WO | 94/05554 | 3/1994 | | |
| WO | 2014/002655 | 1/2014 | | |

* cited by examiner ion Publication No. 2007-182240, these medical waste box and container are formed such that the bottom thereof is horizontal and flat. Thus, when injection containers are loaded randomly in a medical waste box or the like, an injection container may sometimes be self-supported on the bottom. In particular, vials and ampuls are likely to be self-supported because the center of gravity is lowered when an injection remains therein (See FIG. 10).

An identification device that identifies objects in the above-described picking system as disclosed in Japanese Unexamined Patent Application Publication No. 2008-62376 is mainly configured such that the interior of a medical waste box is imaged from an upper side using a camera to obtain image data and the image data is processed to identify objects.

Moreover, injection containers such as a syringe of an injector, an ampul, or a vial are generally formed in a cylindrical shape such as, for example, a circular cylindrical shape, and are characterized in their side geometry rather than their planar shape.

Further, the injection containers generally have a larger length in the longitudinal direction of the cylinder than a cylinder diameter. When an injection container in the self-supported state and an injection container in the toppled state are imaged from the same upper position, the area (that is, the number of pixels) of the image of the injection container in the self-supported state is smaller than the area of the image of the injection container in the toppled state. Hence, it is more difficult to process the image of the injection container in the self-supported state than the image of the injection container in the toppled state.

Thus, for example, in the above-described identifying device, it is easier to identify the injection container in the toppled state than identifying the injection container in the self-supported state.

That is, since an injection container collected in the medical waste box of Japanese Unexamined Patent Application Publication No. 10-328253 or the container of Japanese Unexamined Patent Application Publication No. 2007-182240 may be in the self-supported state, there is a problem in that the above-described identifying device cannot easily identify the injection container in the self-supported state and it is difficult to pick up the injection container.

In a medical field, in many cases, waste materials such as a removed ampul head or a vial cap separated from a vial as well as injection containers are disposed into a medical waste box (see FIGS. 2A to 2C). Due to this, after the injection containers only are picked up, these waste materials remain in the medical waste box. However, according to the medical waste box of Japanese Unexamined Patent Application Publication No. 10-328253 or the like, a person needs to perform a complex waste material discharging operation, for example, by removing the medical waste box from the identifying device and turning the medical waste box upside down when discharge the waste materials.

The present invention has been made in view of the problems of the above-described conventional techniques, and an object of the present invention is to provide an injection container storage box device which is ideal for acquiring image data of injection containers stored randomly from an upper side and picking up the injection containers one by one based on the image data and which can easily discharge a waste material such as an ampul head from the injection container storage box device and to provide an injection container picking system including the injection container storage box device.

INJECTION CONTAINER STORAGE BOX DEVICE AND INJECTION CONTAINER PICKING SYSTEM INCLUDING THE DEVICE

REFERENCE TO RELATED APPLICATION

This is a divisional application of Ser. No. 14/140,001, filed Dec. 24, 2013 which is currently allowed. The subject matter of the aforementioned prior application is hereby incorporated herein by reference.

FIELD OF THE INVENTION

The present invention relates to a storage box device used for storing injection containers delivered from a dispensary or the like of a hospital, for example, to a medical field. In particular, the present invention relates to an injection container storage box device ideal for picking these injection containers one by one based on image data obtained from the stored injection containers and to an injection container picking system including the injection container storage box device.

DESCRIPTION OF THE RELATED ART

Conventionally, in a medical field such as a hospital, used-up empty injection containers such as injectors, ampuls, or vials are disposed after being subjected to treatments for example necessary for ensuring safety. Reading the drug cost scores of these disposed injection containers is important from the perspectives of managing the medical costs in a hospital and charging patients for drug costs.

Due to this, in a medical field, an operation of aggregating the drug cost scores of these injection containers is performed. This aggregation operation involves complex and difficult manual operations in which a person picks up injection containers of various shapes from a storage box storing the injection containers, reads information such as labels attached to the outer circumferential surface thereof, and aggregates the information. Thus, reading errors or the like may result in aggregation errors.

In order to solve such a problem, techniques for automating a series of operations of picking up injection containers from a storage box or the like and reading information attached thereto have been developed. For example, Japanese Unexamined Patent Application Publication No. 2008-62376 proposes a picking system for picking up randomly positioned objects and Japanese Unexamined Patent Application Publication No. 2010-115339 proposes an information reading device for reading information on empty injection containers. Further, a reading device for setting an injection container picked up by the picking system of Japanese Unexamined Patent Application Publication No. 2008-62376 on the information reading device of Japanese Unexamined Patent Application Publication No. 2010-115339 and reading information such as labels on the outer circumferential surface of an injection container may be taken into consideration, for example.

Meanwhile, a medical waste box of Japanese Unexamined Patent Application Publication No. 10-328253 or a container of Japanese Unexamined Patent Application Publication No. 2007-182240 has been proposed as an example of a storage box that stores the injection containers.

SUMMARY OF THE INVENTION

As illustrated in Japanese Unexamined Patent Application Publication No. 10-328253 and Japanese Unexamined Pat- According to one aspect of the present invention, there is provided an injection container storage box device that stores a plurality of cylindrical injection containers randomly loaded, including: a housing of which the upper and lower ends are open; and an opening/closing plate disposed in a lower end portion of the housing so as to freely slide to open and close a lower end opening, on which the injection containers are placed, wherein the opening/closing plate includes a corrugated surface in which a plurality of convex portions and a plurality of concave portions alternate continuously in a predetermined direction and the injection containers are put into a toppled state using the corrugated surface.

In the injection container storage box device having the above-mentioned constitution, the housing includes a corrugated lower end portion that can engage with the corrugated surface, the opening/closing plate slides in a direction orthogonal to the predetermined direction, and the corrugated surface slides while approximately engaging with the corrugated lower end portion.

In the injection container storage box device having the above-mentioned constitution, the distance between the adjacent convex portions is larger than a barrel diameter of the injection container.

In the injection container storage box device having the above-mentioned constitution, an upper end portion of the convex portion and a lower end portion of the concave portion are formed in a circular arc shape.

According to another aspect of the present invention, there is provided an injection container picking system including: the injection container storage box device having the above-mentioned constitution; an imaging unit that images the injection containers from an upper side of the injection container storage box device; an image processing unit that processes the image data acquired by the imaging unit; a robot hand that picks up the injection containers one by one; a control unit that controls an operation of the robot hand; and a slide unit that allows the opening/closing plate to slide.

According to the present invention, the injection container storage box device that stores a plurality of cylindrical injection containers randomly loaded includes: a housing of which the upper and lower ends are open; and an opening/closing plate disposed in a lower end portion of the housing so as to freely slide to open and close a lower end opening, on which the injection containers are placed, wherein the opening/closing plate includes a corrugated surface in which a plurality of convex portions and a plurality of concave portions alternate continuously in a predetermined direction and the injection containers are put into a toppled state using the corrugated surface.

Due to such a constitution, even when a cylindrical injection container having a flat lower end portion is loaded in a state where the lower end portion is placed on the opening/closing plate of the injection container storage box device, the injection container is put into an unstable state due to the corrugated surface and is toppled. Thus, it is possible to provide an injection container storage box device ideal for acquiring the image of the stored injection containers from an upper side and picking the injection containers one by one based on the image. Moreover, when the opening/closing plate is slid so that the lower end opening is open, since waste materials such as an ampul cap fall, it is possible to provide an injection container storage box device that can easily discharge the waste materials.

Further, according to the present invention, the housing includes a corrugated lower end portion that can engage with the corrugated surface, the opening/closing plate slides in a direction orthogonal to the predetermined direction, and the corrugated surface slides while approximately engaging with the corrugated lower end portion.

Due to such a constitution, even when the waste materials such as an ampul cap remaining on the opening/closing plate, for example, move together with the opening/closing plate during the sliding of the opening/closing plate, the movement of these waste materials is restricted by the corrugated lower end portion and the waste materials are reliably discharged by falling through the opening opened with the sliding of the opening/closing plate.

Further, according to the present invention, the distance between the adjacent convex portions is larger than a barrel diameter of the injection container.

Due to such a constitution, even when the injection containers are loaded in a state where the lower end portion is placed on the opening/closing plate of the injection container storage box device, the lower end portion is not supported by the adjacent convex portions. Accordingly, the injection container is put into a more unstable state and reliably topples. As a result, it is possible to provide an injection container storage box device more ideal for acquiring the image of the stored injection containers from an upper side and picking the injection containers one by one based on the image.

Further, according to the present invention, the upper end portion of the convex portion and the lower end portion of the concave portion are formed in a circular arc shape.

Due to such a constitution, when the image of the stored injection containers is acquired from the upper side, it is possible to better prevent the upper end portion of the convex portion and the lower end portion of the concave portion from appearing in the image as a strip pattern than when the convex portion and the concave portion are formed in a triangular cross-sectional shape. As a result, it is possible to provide an injection container storage box device capable of acquiring an image more ideal for picking up the injection containers one by one based on the image.

Further, according to the present invention, the injection container picking system includes: the injection container storage box device having the above-mentioned constitution; an imaging unit that images the injection containers from an upper side of the injection container storage box device; an image processing unit that processes the image data acquired by the imaging unit; a robot hand that picks up the injection containers one by one; a control unit that controls an operation of the robot hand; and a slide unit that allows the opening/closing plate to slide.

Due to such a constitution, it is possible to provide an injection container picking system that can easily identify the injection containers stored in the injection container storage box device, pick up the injection containers with high accuracy, and discharge waste materials from the injection container storage box device easily.

DETAILED DESCRIPTION OF THE INVENTION

Hereinafter, an embodiment of the present invention will be described with reference to the drawings.

The present invention relates to a storage box device in which a plurality of cylindrical empty injection containers or the like such as used-up ampuls used in a medical field such as an operating room, for example, is loaded randomly. An injection container storage box device of the present embodiment includes a housing of which the upper and lower ends are open; and an opening/closing plate disposed in a lower end portion of the housing so as to freely slide to open and close a lower end opening, on which the injection containers are placed, wherein the opening/closing plate includes a corrugated surface in which a plurality of convex portions and a plurality of concave portions alternate continuously and the injection containers are put into a toppled state using the corrugated surface. The injection container storage box device of the present embodiment is provided in an injection container picking system described later and is ideal for picking up injection containers one by one and discharging waste materials such as an ampul cap easily.

Prior to description of an injection container storage box device 10 according to the present embodiment, an object stored in the injection container storage box device 10 will be described with reference to FIGS. 1 and 2.

As illustrated in FIGS. 1A to 1C and FIGS. 2A to 2C, examples of the object include a cylindrical injection container 1 and a waste material such as a removed ampul head 2a or a vial cap 2b removed from the head of a vial.

Figure 1A:
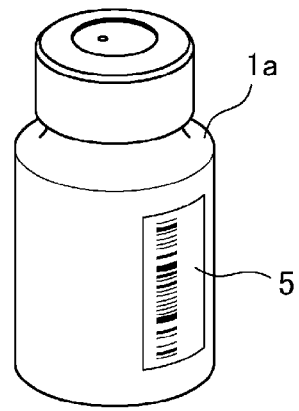
FIGS. 1A to 1C are diagrams for describing examples of an injection container according to an embodiment of the present invention.
Figure 1B:
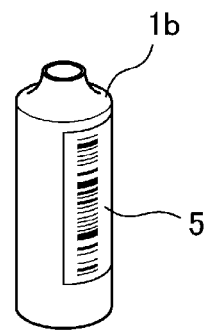
Figure 1C:
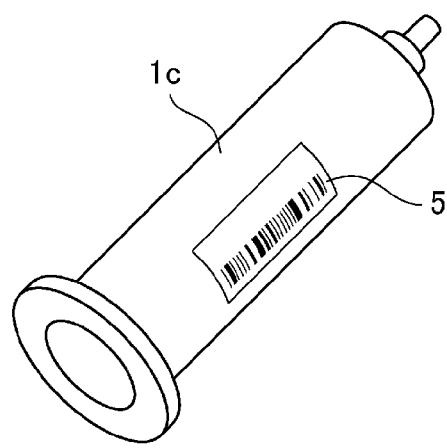

The cylindrical injection container 1 means an injection container such as a vial 1a illustrated in FIG. 1A, an ampul 1b illustrated in FIG. 1B, or a syringe 1c of an injector illustrated in FIG. 1C. The shape of these empty injection containers is not limited to a circular cylindrical shape, and for example, the empty injection container may be formed in various cylindrical shapes such as a hexagonal cylindrical shape having an approximately hexagonal cross-sectional shape or a cylindrical shape having a rectangular cross-sectional shape that is close to an approximately elliptical shape. The injection container 1 may be an empty injection container with no injection in the container, an injection container with a small amount of injection remaining therein, or a sealed injection container like an unused injection container.

As illustrated in FIGS. 1A to 1C, these injection containers 1 have information such as a barcode 5 attached on their side surface. This barcode 5 includes identification information corresponding to the injection container, such as the name of an injection or a cost price, for example.

These injection containers 1 are stored in the injection container storage box device 10, are picked up one by one by an injection container picking system 40 described later, for example, and are set on an information reading device (for example, see Japanese Unexamined Patent Application Publication No. 2010-115339) having a barcode reading function to read various items of information such as barcodes. These items of information are used for charging drug costs, cost management, or drug management.

Figure 2A:
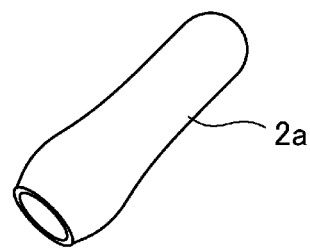
FIGS. 2A to 2C are diagrams for describing examples of a waste material according to an embodiment of the present invention.
Figure 2B:
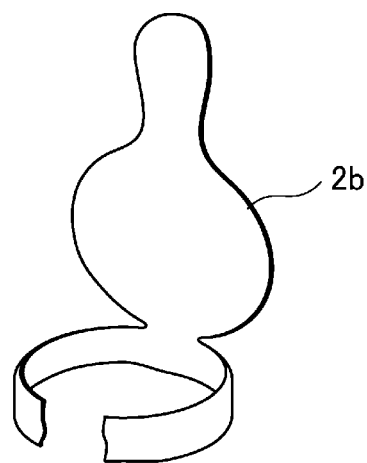
Figure 2C:

FIGS. 2A to 2C illustrate examples of waste materials such as an ampul head 2a, a vial cap 2b, or a glass piece 2c.

Hereinafter, an example of the injection container storage box device according to the present embodiment will be described with reference to FIGS. 3A and 3B to FIGS. 8A and 8B.

Figure 3A:
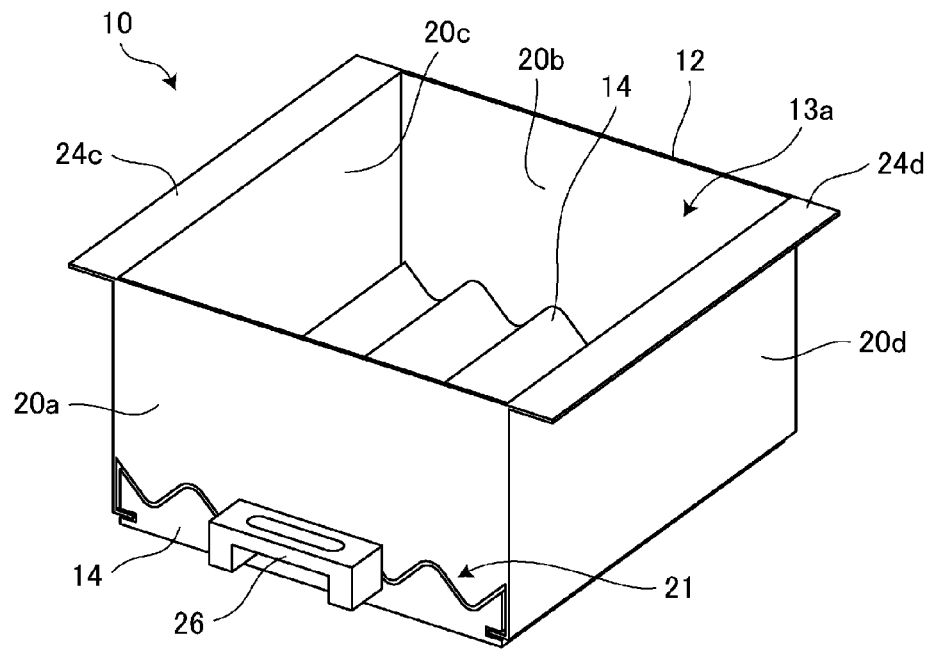
FIGS. 3A and 3B are perspective views of an injection container storage box device according to an embodiment of the present invention.
Figure 3B:
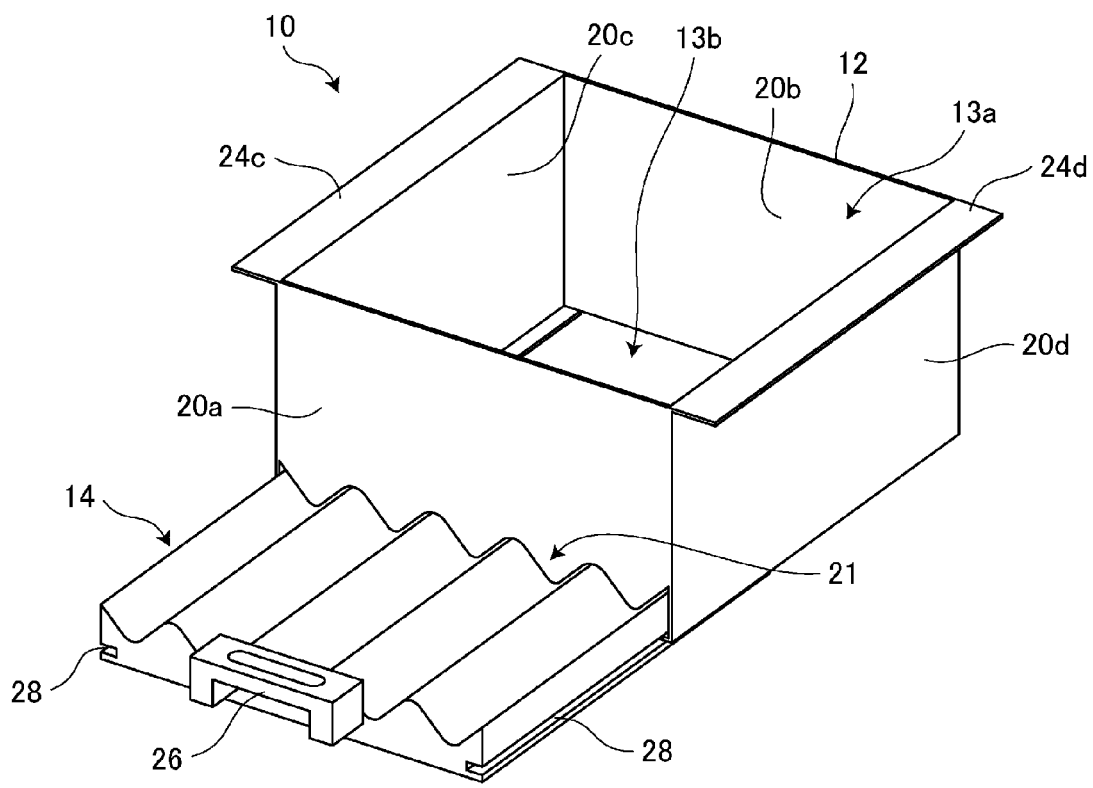
Figure 4A:
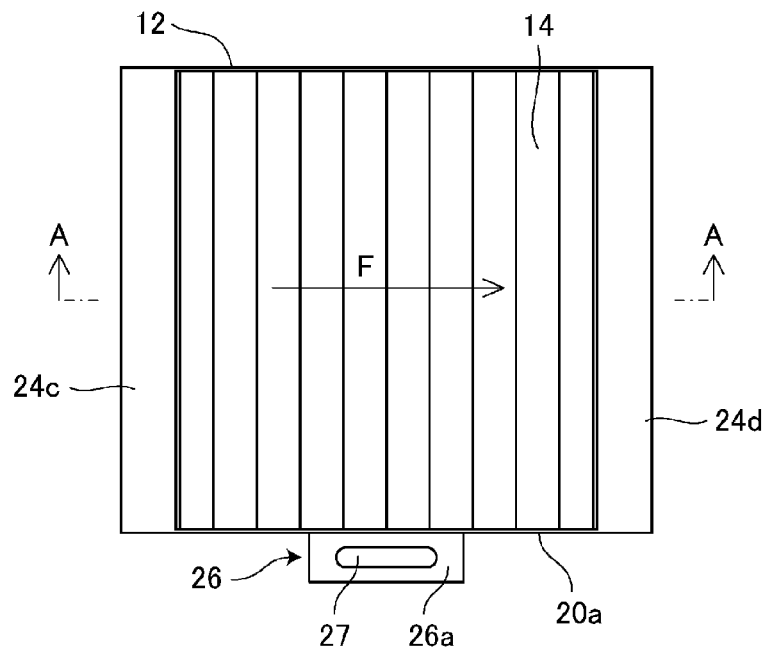
FIGS. 4A and 4B are plan views of the injection container storage box device according to an embodiment of the present invention.
Figure 4B:
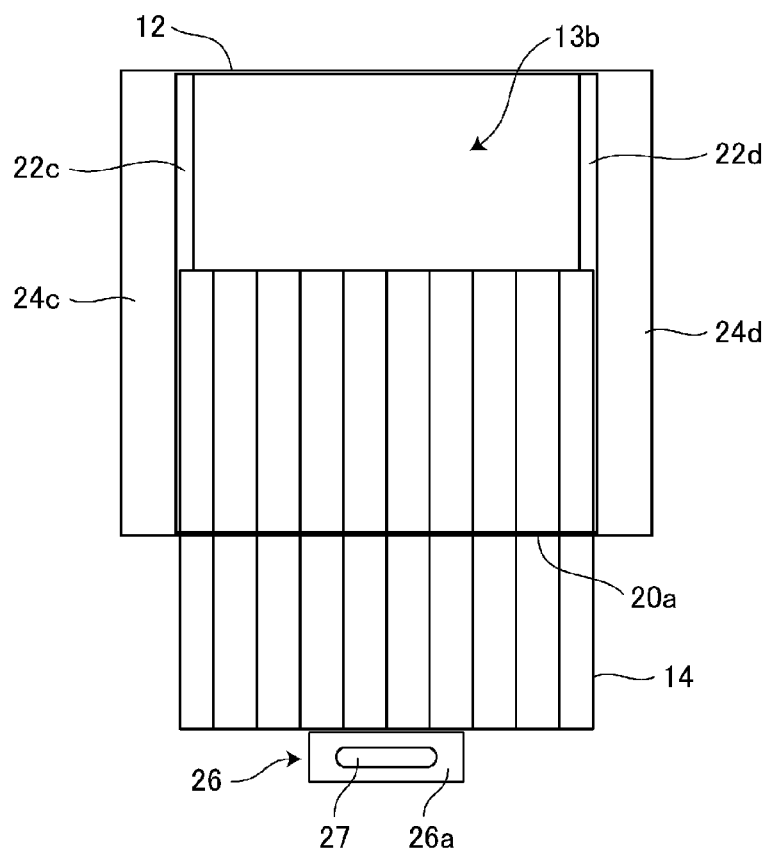

As illustrated in FIGS. 3A and 3B, an injection container storage box device 10 of the present embodiment includes a housing 12 and an opening/closing plate 14 on which the injection containers 1 are placed. FIG. 3A illustrates a state where the opening/closing plate 14 is received and a lower end opening 13b of the housing 12 is closed, and FIG. 3B illustrates a state where approximately half of the opening/closing plate 14 is drawn out. FIG. 4A illustrates a plan view corresponding to FIG. 3A, and FIG. 4B illustrates a plan view corresponding to FIG. 3B.

Figure 5:
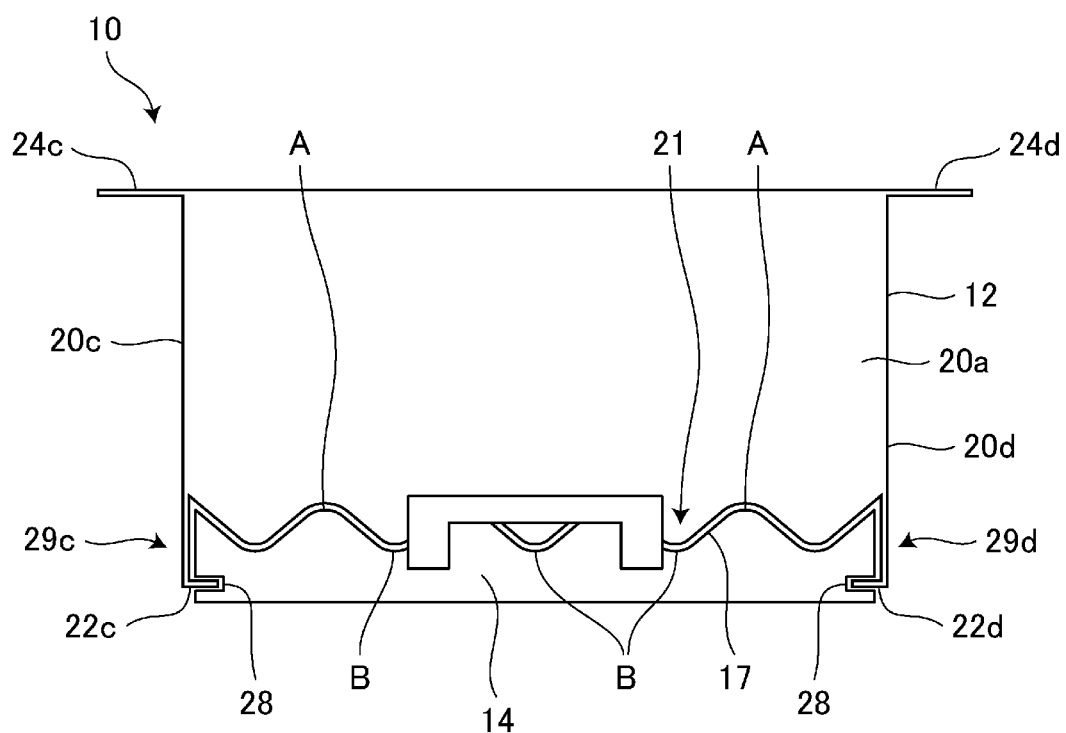
FIG. 5 is a front view of the injection container storage box device according to an embodiment of the present invention.
Figure 6:
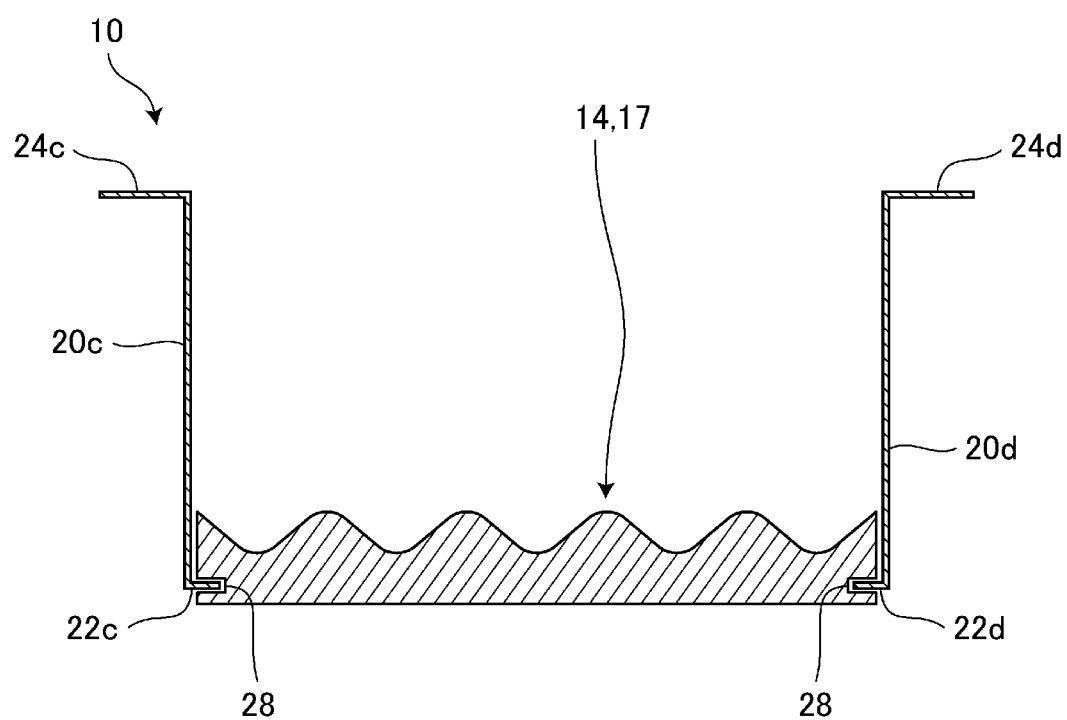
FIG. 6 is an end view along line A-A of FIG. 4.

First, as illustrated in FIGS. 3A and 3B and FIGS. 4A and 4B, the housing 12 is formed in a rectangular parallelepiped hollow container form that has an upper end opening 13a and a lower end opening 13b. More specifically, as illustrated in FIGS. 3A and 3B and FIG. 5, the housing 12 includes a front vertical plate member 20a, a rear vertical plate member 20b, a left vertical plate member 20c, and a right vertical plate member 20d. As illustrated in FIGS. 5 and 6, the housing 12 includes small projecting plates 22c and 22d that protrude in an approximately horizontal direction toward the inner side of the housing 12 from respective lower end portions 29c and 29d of the left and right vertical plate members 20c and 20d. The projecting plates 22c and 22d will be described later.

As illustrated in FIGS. 3A and 3B, FIGS. 4A and 4B, and FIG. 5, the housing 12 includes small latching plates 24c and 24d that protrude in an approximately horizontal direction toward the outer side of the housing 12 from respective upper ends of the left and right vertical plate members 20c and 20d. The latching plates 24c and 24d are latched to a frame 43 described later, whereby the housing 12 can be supported by the frame 43.

As illustrated in FIGS. 3A and 3B and FIG. 5, the lower end portion of the front vertical plate member 20a of the housing 12 is formed of a corrugated lower end portion 21. Specifically, as illustrated in FIGS. 5 and 7, the corrugated lower end portion 21 is formed in approximately the same wavy form as a corrugated surface 17 when seen from a direction orthogonal to a wave propagation direction F described later.

Injection containers 1a, 1b, and 1c are randomly loaded into the housing 12 from the upper end opening 13a of the housing 12 formed in this manner. In this case, waste materials such as an ampul head 2a, a vial cap 2b, and a glass piece 2c are also loaded.

The shape of the housing is not limited to the rectangular parallelepiped shape of the present embodiment, and the housing may be formed in a circular cylindrical shape or an elliptical cylindrical shape of which the upper end is open, for example.

Figure 7:
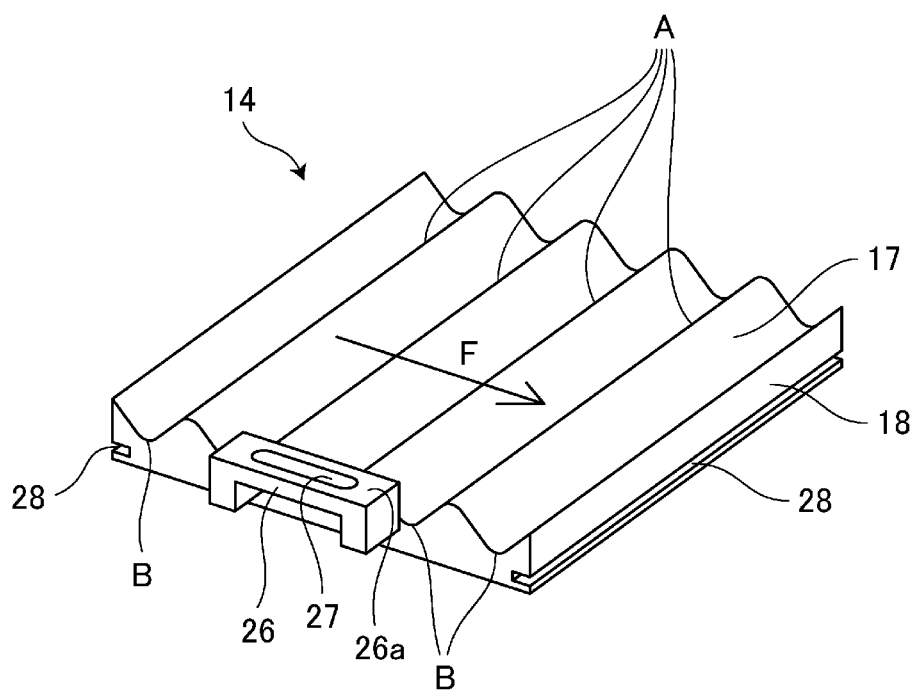
FIG. 7 is a perspective view for describing an opening/closing plate of the injection container storage box device according to an embodiment of the present invention.

The opening/closing plate 14 which is a main part of the present embodiment includes a main body 18 including the corrugated surface 17 and a grip 26 as illustrated in FIGS. 4A and 4B and FIG. 7.

As illustrated in FIG. 4A, the main body 18 of the present embodiment is formed of a plate member having a rectangular shape in a plan view of approximately the same size as the bottom portion of the housing 12. As illustrated in FIG. 7, the upper surface of the main body 18 is formed as the corrugated surface 17 in which a plurality of convex portions A and a plurality of concave portions B alternate continuously in the wave propagation direction F which is the predetermined direction.

Figure 8A:
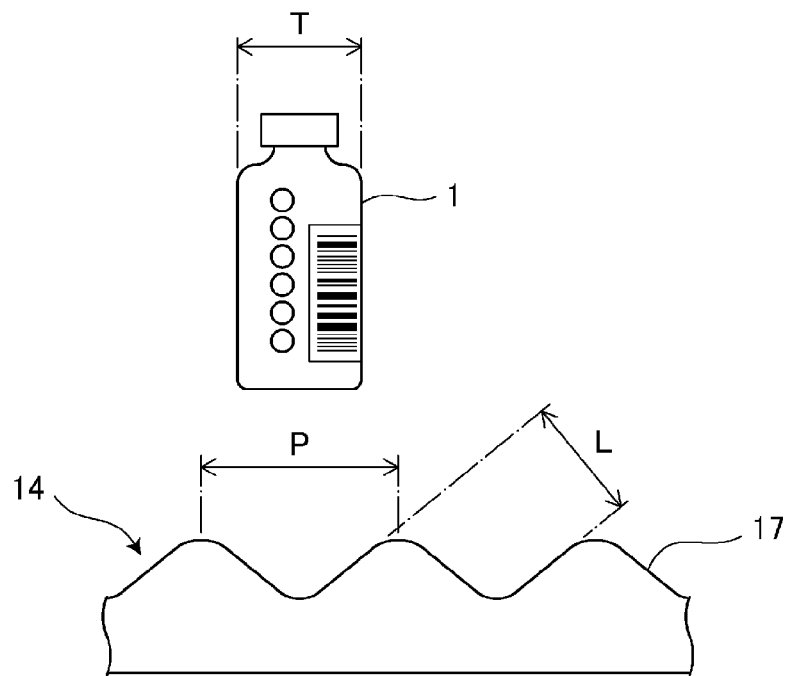
FIGS. 8A and 8B are diagrams for describing a corrugated surface of the opening/closing plate according to an embodiment of the present invention.
Figure 8B:
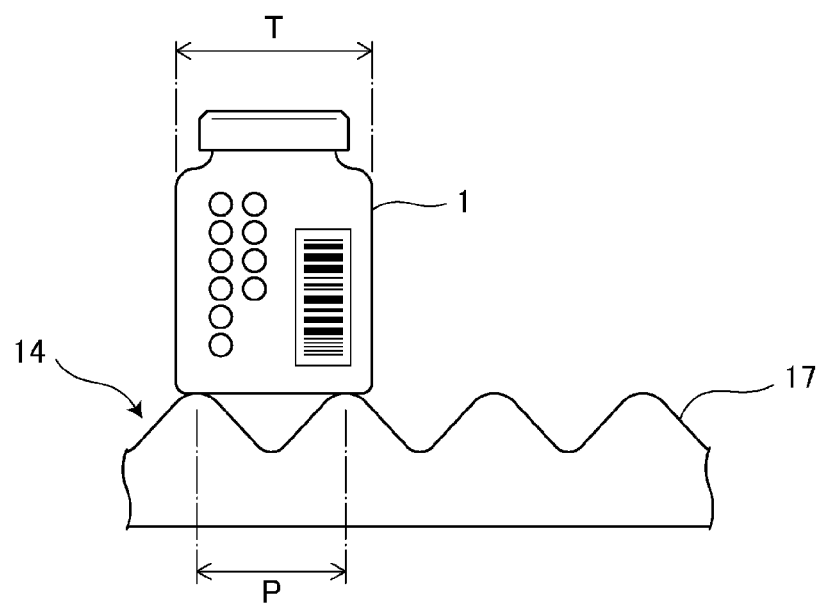

More specifically, as illustrated in FIG. 5, FIG. 6, and FIGS. 8A and 8B, the corrugated surface 17 is formed such that the upper ends of the plurality of convex portions A are at the same height. In this case, as illustrated in FIG. 8A, the distance P between the adjacent convex portions is preferably larger than a cylinder diameter T of the injection container 1. This is because, if the distance P is smaller than the cylinder diameter T as illustrated in FIG. 8B, even when the injection container 1 is loaded in a state where the lower end portion thereof is placed on the corrugated surface 17, for example, the lower end portion can be supported by the adjacent convex portions. As a result, the injection container 1 can be self-supported.

As illustrated in FIGS. 5 to 7 and FIGS. 8A and 8B, although the upper end portion of the convex portion A and the lower end portion of the concave portion B of the present embodiment have a circular arc shape in a cross-sectional view, the cross-sectional shape of the convex portion and the concave portion is not limited to the circular arc shape but may be a triangular shape. When the convex portion and the concave portion have a triangular cross-sectional shape, due to a difference in light reflection patterns on the apex of a triangle and a slope surface of the triangle, a linear image extending along the apexes may appear in an image obtained by an imaging unit of a picking device described later. Since such a linear image is a noise image that is not related to the image of the injection container 1, a noise removal process may be executed during the image processing as necessary.

When the convex portion and the concave portion have a circular arc shape in a cross-sectional view, the peaks of the convex portions and the troughs of the concave portions are imaged more smoothly than the same is formed in a triangular shape. Thus, the difference in light reflection patterns on the apex of the convex portion (or the concave portion) and the slope surface of the convex portion (or the concave portion) decreases. As a result, it is possible to prevent a linear image extending along the apexes (or the troughs) from appearing in the above-described image.

The length of the slope surface of a wave (more specifically, the vertical length L of the slope surface of the wave as illustrated in FIG. 8A) is preferably smaller than half of the height of the injection container 1. This is because, if the length L is larger than half of the height of the injection container 1, the injection container 1 may lean on the slope surface of the wave.

As illustrated in FIGS. 4A and 4B and FIG. 7, the grip 26 includes a plate 26a having a through-hole 27. As illustrated in FIGS. 4A and 4B and FIG. 7, the grip 26 protrudes from one end of the main body 18 parallel to the wave propagation direction F in a state where the surface of the plate is approximately horizontal.

As illustrated in FIGS. 4A and 4B and FIGS. 5 and 7, the main body 18 includes grooves 28 that are formed on both side ends orthogonal to the wave propagation direction F so as to extend in a direction orthogonal to the wave propagation direction F. The grooves 28 are formed as grooves having a width slightly larger than the thickness of the projecting plates 22c and 22d.

As illustrated in FIGS. 3A and 3B, FIGS. 4A and 4B, and FIGS. 5 and 6, the opening/closing plate 14 formed in this manner is attached to the lower end portions 29c and 29d of the housing 12 with the projecting plates 22c and 22d inserted in the grooves 28, respectively, in a state where the corrugated surface 17 faces the upper side. In this case, the corrugated lower end portion 21 is positioned slightly above the corrugated surface 17 in a front view as illustrated in FIG. 5 and is attached in such a way that it is approximately fitted to the corrugated surface 17. Thus, as illustrated in FIGS. 3A and 3B and FIGS. 4A and 4B, the opening/closing plate 14 of the present embodiment is attached to the lower end portion of the housing 12 so as to freely slide in a direction orthogonal to the wave propagation direction F and is configured to open and close the lower end opening 13b. Moreover, in this case, the corrugated surface 17 is configured to slide while being approximately fitted to the corrugated lower end portion 21 as illustrated in FIGS. 3A and 3B. Due to this, the waste materials such as the ampul head 2a remaining on the opening/closing plate 14 are reliably discharged downward from the lower end opening 13b since the movement toward the corrugated lower end portion 21 is restricted even when the opening/closing plate 14 is slid (see FIG. 11).

The function of the corrugated surface 17 of the present embodiment will be described with reference to FIGS. 9A to 9C and FIGS. 10A and 10B.

Figure 9A:
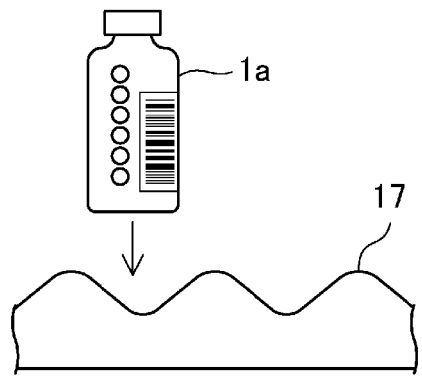
FIGS. 9A to 9C are diagrams for describing the function of the injection container storage box device according to an embodiment of the present invention.
Figure 9B:
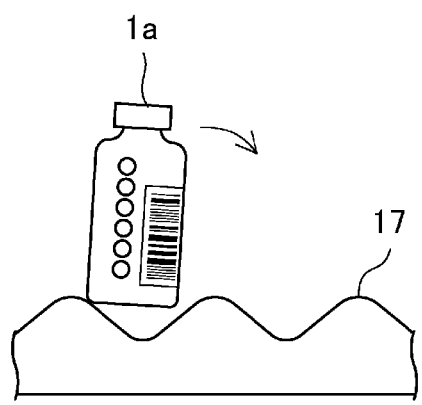
Figure 9C:
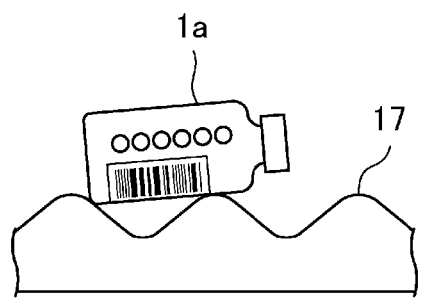
Figure 10A:
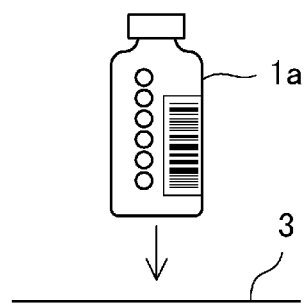
FIGS. 10A and 10B are diagrams for describing examples of a conventional injection container storage box.
Figure 10B:
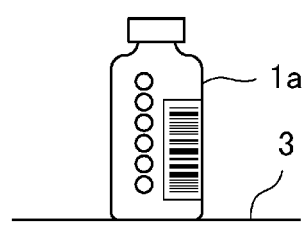

FIGS. 9A to 9C illustrate examples of the injection container storage box device 10 according to the present embodiment, and FIGS. 10A and 10B illustrate examples of a conventional medical waste box for comparison.

First, as illustrated in FIG. 10A, in the case of the conventional injection container storage box, when the vial 1a, for example, as the injection container is loaded into the injection container storage box in a state where the lower end portion faces downward, the vial 1a is sometimes self-supported on a flat bottom portion 3 of the injection container storage box as illustrated in FIG. 10B. In particular, when an injection remains in the ampul 1b or the vial 1a, the ampul 1b or the vial 1a is likely to be self-supported because the center of gravity is lowered.

In contrast, according to the injection container storage box device 10 of the present embodiment, even when the vial 1a is loaded into the injection container storage box device 10 in a state where the lower end portion faces downward as illustrated in FIG. 9A, the lower end portion of the vial 1a is caught on the corrugated surface 17 as illustrated in FIG. 9B, and the vial 1a is likely to be put into an unstable state and is toppled. Thus, the vial 1a is put into a toppled state as illustrated in FIG. 9C. Due to this, when the injection container 1 is imaged by an imaging unit of the injection container picking system described later, it is possible to obtain an image ideal for image processing, which will be described later.

As described above, the injection container storage box device 10 of the present embodiment is configured to put the injection container 1 into a toppled state using the corrugated surface 17 when the injection container 1 loaded from the upper end opening of the housing 12 is caught on the opening/closing plate 14.

Next, the injection container picking system 40 of another embodiment of the present invention will be described with reference to FIG. 11.

The injection container picking system 40 includes the above-described injection container storage box device 10, a frame 43 that supports the injection container storage box device 10, an imaging unit 42, a robot hand 44, an image processing unit 46, a slide unit 56, and a control unit 48 that controls the operations of the robot hand 44, the slide unit 56, and the like.

Figure 11:
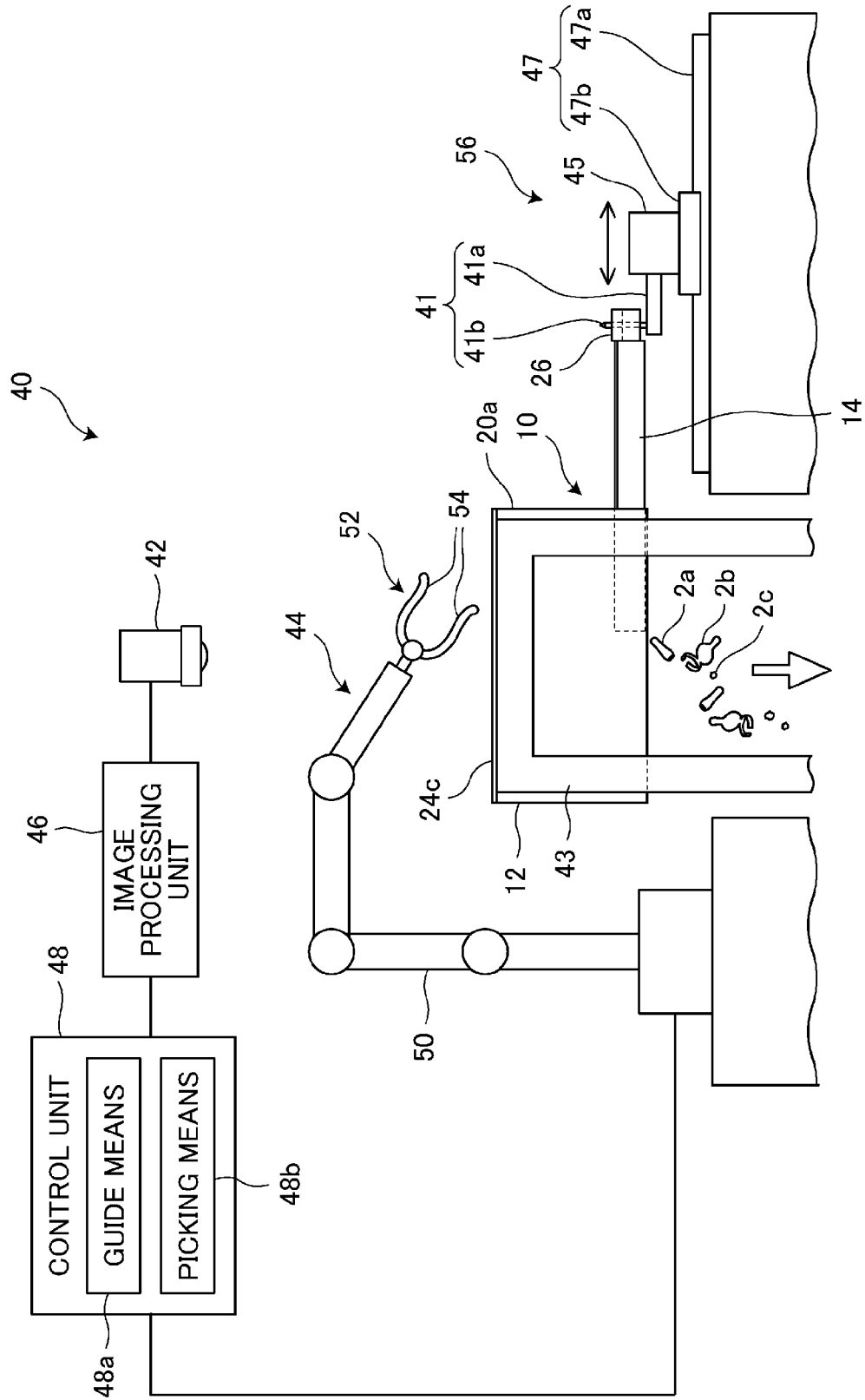
FIG. 11 is a diagram for describing an injection container picking system according to an embodiment of the present invention.

As illustrated in FIG. 11, the frame 43 is formed of a casing, for example. As illustrated in FIG. 11, the injection container storage box device 10 is fitted into the casing of the frame 43 and is supported by the frame 43 in a state where the latching plates 24c and 24d are placed on the upper end of the frame 43. In this manner, the injection container storage box device 10 is disposed at a predetermined position.

The imaging unit 42 is configured as an existing digital camera, for example. As illustrated in FIG. 11, the imaging unit 42 is disposed above the injection container storage box device 10 to image the injection container 1 in the injection container storage box device 10 from the upper side of the injection container storage box device 10 and transmits the image data of the injection container 1 to the image processing unit 46. The imaging unit may be configured to include a plurality of digital cameras, for example, and acquire 3-dimensional image data of the injection container 1.

The image processing unit 46 is configured to include an existing image processing CPU, for example, process the image data from the imaging unit 42, and identify the injection container 1.

As illustrated in FIG. 11, the robot hand 44 includes an existing multi joint robot arm 50, for example, and a holder 52 that holds the injection container 1.

As illustrated in FIG. 11, the holder 52 of the present embodiment is configured to pinch the side portion of the injection container 1 using two claw members 54, for example, and is provided at a distal end of the arm 50. The holder is not limited to the configuration where it pinches the injection container 1 as in the present embodiment, but for example, the holder 52 may be configured to hold the injection container 1 using vacuum adsorption, for example.

As illustrated in FIG. 11, the slide unit 56 includes a withdrawal arm 41 and a slide mechanism 47 that slides the withdrawal arm 41.

As illustrated in FIG. 11, the withdrawal arm 41 includes a rod member 41a and a pin member 41b, for example. The rod member 41a of the present embodiment is formed of a cylindrical rod. As illustrated in FIG. 11, the rod member 41a is disposed slightly below the grip 26 of the injection container storage box device 10 that is supported by the frame 43. More specifically, as illustrated in FIG. 11, the rod member 41a is disposed so that the longitudinal direction is orthogonal to the front vertical plate member 20a.

As illustrated in FIG. 11, the pin member 41b is formed of a pin that can be inserted into a through-hole 27 of the grip 26. The pin member 41b is attached to the rod member 41a in such a way that the pin member 41b protrudes in a direction orthogonal to the longitudinal direction of the rod member 41a from the distal end of the rod member 41a as illustrated in FIG. 11.

The slide mechanism 47 may be an existing LM (Linear Motion) guide mechanism, for example, as illustrated in FIG. 11. For example, an LM block 47b may be attached onto an LM rail 47a, and the LM block 47b may be slid along the LM rail 47a.

The slide mechanism is not limited to the LM guide mechanism, but an optional slide mechanism such as a rack-and-pinion mechanism may be used, for example.

The withdrawal arm 41 and the slide mechanism 47 formed in this manner are linked by a rotation drive unit 45 as illustrated in FIG. 11.

The rotation drive unit 45 is formed of an existing motor. As illustrated in FIG. 11, the rod member 41a has a base end linked to the rotation drive unit 45 and rotates about the central shaft of the rod member 41a according to the rotation drive unit 45. Moreover, the rotation drive unit 45 is fixed to the LM block 47b and is slid together with the LM block 47b as illustrated in FIG. 11.

Thus, for example, the rotation drive unit 45 rotates the rod member 41a so that the pin member 41b faces downward, and the slide mechanism 47 moves the pin member 41b so that the pin member 41b is positioned below the through-hole 27. Subsequently, when the rotation drive unit 45 rotates the rod member 41a so that the pin member 41b faces upward, the pin member 41b is inserted into the through-hole 27 of the grip 26, and the grip 26 engages with the withdrawal arm 41. In this state, when the withdrawal arm 41 is slid by the slide mechanism 47, the waste materials such as the ampul head 2a in the injection container storage box device 10 can be discharged by withdrawing the opening/closing plate 14, as illustrated in FIG. 11.

The control unit 48 is configured as an existing computer, for example. The control unit 48 includes a guide means 48a that guides the robot hand 44 to the injection container 1 based on the data processed by the image processing unit 46 and a picking means 48b that corrects the attitude of the robot hand 44 and move the holder 52 so as to perform a picking operation. The control unit 48 controls the operation of the robot hand 44. The control unit 48 is connected to the slide unit 56 so as to control the operation of the slide unit.

As described above, according to the injection container picking system 40 of the above-mentioned embodiment, the injection container 1 loaded into the injection container storage box device 10 is put into a toppled state. In general, when the injection container 1 is imaged from the same distance, an image in a side view is larger than an image in a plan view. That is, the amount of information of the image obtained by imaging the injection container 1 in the toppled state from the upper side is larger than the amount of information of the image obtained by imaging the injection container 1 in the self-supported state from the upper side. Thus, it is easy to extract the features from the image obtained by imaging the injection container 1 in the toppled state from the upper side during the image processing of the injection container picking system 40. Thus, it is ideal because it is easy to identify the injection container 1. According to the injection container picking system 40 of the above-mentioned embodiment, it is possible to easily discharge waste materials such as an ampul head in the injection container storage box device 10 by sliding the opening/closing plate 14 without taking the injection container storage box device 10 out of the injection container picking system 40, for example.

As described above, according to the injection container storage box device 10 of the present embodiment, it is possible to provide an injection container storage box device which is ideal for acquiring image data of injection containers stored randomly from an upper side and picking up the injection containers one by one based on the image data and to provide the injection container picking system 40 including the injection container storage box device. Moreover, according to the injection container picking system 40 of another embodiment, it is possible to easily discharge waste materials such as an ampul head from the injection container storage box device 10.

While several embodiments of the present invention have been described in detail based on the drawings, these embodiments are examples only, and various modifications and improvements can be made to the present invention based on the knowledge of those skilled in the art.

What is claimed is:

1. An injection container picking system comprising:
   an injection container storage box device;
   an imaging unit that images injection containers from an upper side of the injection container storage box device;
   an image processing unit that processes image data acquired by the imaging unit;
   a robot hand that picks up the injection containers one by one;
   a slide unit that allows an opening/closing plate to slide; and
   a control unit that controls an operation of the robot hand and the slide unit,
   wherein the injection storage box device comprises
   a housing of which upper and lower ends each comprise a respective opening; and
   the opening/closing plate disposed in a lower end portion of the housing so as to freely slide to open and close the lower end opening, the opening/closing plate in a closed state supporting the injection containers in a randomly toppled state,
   wherein the upper end opening of the housing is configured to accommodate passage into the storage box device of the injection containers dropped from above into the storage box device, the injection containers being of a predetermined diameter and having a flat external bottom surface; and
   the opening/closing plate includes a corrugated surface in which a plurality of convex portions and a plurality of concave portions, the convex portions being of a same height, alternate continuously in a predetermined direction and spacing of apices of mutually adjacent convex portions is greater than the diameter of the injection containers whereby the corrugated surface does not support the injection containers in an upright orientation.

2. The injection container picking system according to claim 1, wherein on the corrugated surface of the opening/closing plate, an upper end portion of the convex portion and lower end portion of the concave portion are formed in a circular arc shape.

* * * * *